(12) United States Patent
Kim

(10) Patent No.: US 7,078,839 B2
(45) Date of Patent: Jul. 18, 2006

(54) SELF-BEARING STEP MOTOR AND ITS CONTROL METHOD

(76) Inventor: Dae-gon Kim, 109-1002 Cheolsan Hanshin APT, Cheolsan 3-dong, Kwangmyung-si, Kyunggi-do (KR) 423-739

( * ) Notice: Subject to any disclaimer, the term of this patent is extended or adjusted under 35 U.S.C. 154(b) by 47 days.

(21) Appl. No.: 10/467,594

(22) PCT Filed: Feb. 19, 2002

(86) PCT No.: PCT/KR02/00254

§ 371 (c)(1),
(2), (4) Date: Aug. 7, 2003

(87) PCT Pub. No.: WO02/067407

PCT Pub. Date: Aug. 29, 2002

(65) Prior Publication Data

US 2004/0066105 A1 Apr. 8, 2004

(30) Foreign Application Priority Data

Feb. 19, 2001 (KR) .......................... 2001-0008287

(51) Int. Cl.
*H02K 7/09* (2006.01)
*H02K 19/06* (2006.01)
*H02K 37/00* (2006.01)

(52) U.S. Cl. .................... 310/90.5; 310/168; 318/685; 318/696

(58) Field of Classification Search ............... 310/90.5, 310/166, 168, 696; 318/685, 696, 430, 431, 318/432, 433, 434

See application file for complete search history.

(56) References Cited

U.S. PATENT DOCUMENTS 5,424,595 A * 6/1995 Preston et al. ............ 310/90.5

(Continued)

FOREIGN PATENT DOCUMENTS

JP 05038121 A 2/1993
JP 06269144 A 9/1994

OTHER PUBLICATIONS

Takemoto et al., "Improved Analysis of a Bearingless Switched Reluctance Motor" pp. 26-33, IEEE Transactions on Industry Applications, vol. 37, No. 1 Jan./Feb. 2001.*

(Continued)

*Primary Examiner*—Darren Schuberg
*Assistant Examiner*—David W. Scheuermann
(74) *Attorney, Agent, or Firm*—Volpe and Koenig, P.C.

(57) ABSTRACT

The present invention relates to a self-bearing step motor, and more particularly, to self-bearing step motor system and a control method thereof, wherein a rotor can be supported by magnetic force without adding an additional winding for supporting the rotor to a step motor having no mechanical bearing for supporting the rotor. The self-bearing step motor system of the present invention comprises a self-bearing step motor including a rotor having a plurality of rotor teeth, a stator having a plurality of stator teeth, a plurality of separate windings wound respectively around the plurality of stator teeth, and a plurality of sensors for measuring geometric deviation of the rotor; and a controller which transforms a torque current for causing the rotor to rotate and control currents for performing a bearing function of supporting the rotor into predetermined supply currents capable of generating magnetic force for allowing the rotor to be supported while causing the rotor to rotate in accordance with outputs of the sensors and position angles of the plurality of windings, which are fed back to the controller, and simultaneously distributes the supply currents among the plurality of windings grouped so that the same phase currents can be supplied thereto. According to the present invention, the self-bearing step motor can replace the conventional step motor. In particular, owing to advantages of the magnetic levitation technology, the self-bearing step motor can be used semipermanently even in a severe environment needed for a super clean and vacuum system without maintenance thereof. Thus, a wide industrial application thereof can be obtained.

4 Claims, 3 Drawing Sheets

U.S. PATENT DOCUMENTS 5,880,549 A * 3/1999 Chiba et al. ................. 310/168
6,049,148 A * 4/2000 Nichols et al. ........... 310/68 B
6,078,119 A * 6/2000 Satoh et al. ................ 310/90.5
6,130,494 A * 10/2000 Schob ....................... 310/90.5
6,249,067 B1 * 6/2001 Schob et al. .............. 310/68 B

OTHER PUBLICATIONS

IEEE Transaction of Industry Applications, Jan./Feb. 2001, vol. 37, No. 1, The first four sheets. (note the Received Stamp date of Feb. 23, 2001 on the third sheet.).*

* cited by examiner

SELF-BEARING STEP MOTOR AND ITS CONTROL METHOD

TECHNICAL FIELD

The present invention relates to a self-bearing step motor, and more particularly, to a self-bearing step motor system and a control method thereof, wherein a rotor can be supported by magnetic force without adding an additional winding for supporting the rotor to a step motor having no mechanical bearing for supporting the rotor.

BACKGROUND ART

In general, a self-bearing motor is called a bearingless motor or an integrated motor bearing. Since the self-bearing motor does not need to use any mechanical bearings, its volume and weight can be reduced. Further, since the self-bearing motor utilizes a magnetic levitation technology, friction and wear thereof can be minimized. Furthermore, since there is no need for lubrication in the self-bearing motor contrary to the mechanical bearings, effective maintenance and semipermanent use thereof can be made.

FIG. 2 shows a sectional view of an asymmetric conventional 3-phase step motor including a stator 20 with fifteen stator teeth 21 and a rotor 10 with ten rotor teeth 11. Coils (windings) 30 are wound around the stator teeth. As shown in FIG. 2, the conventional step motor is constructed such that the rotor 10 is rotated by magnetic force while coils, which are connected in series and supplied with same phase currents, are excited in alternating order by means of three phase currents supplied from a step motor controller 40. When the coils are excited by the respective phase currents, in case of the step motor shown in FIG. 2, five electromagnets connected in series are simultaneously excited. In the asymmetric step motor, when the coils are excited by the respective phase currents, the electromagnets for generating electromagnetic force are not arranged symmetrically around the circumference of the stator circle.

A self-bearing step motor, which is supported by magnetic force by adding an additional winding without any mechanical bearings, is disclosed in detail in U.S. Pat. No. 4,683,391 entitled "magnetically floating actuator having angular positioning function" issued to Toshiro Higuchi. FIG. 1 is a schematic view of the self-bearing step motor of the '391 patent As shown in FIG. 1, a technique disclosed in the '391 patent is characterized in that a single actuator was allowed to perform the motor and bearing functionalities simultaneously by adding bearing coils (bearing windings) 60 for generating the magnetic force to support a rotor 80 to torque coils (torque windings) 50 of electromagnets of the conventional step motor. Further, the '391 patent discloses that X-axis and Y-axis motions of the rotor 80 are controlled in a state where a stator 70 is divided into four segments.

However, in the technique disclosed in the '391 patent, the structure of the stator 70 should be separately designed to accommodate the windings of the bearing coils, and additional bearing coils and equipments for controlling the additional bearing coils are needed. Thus, the substantial effect of reduction in volume and weight of the step motor owing to elimination of the mechanical bearing is not too great. In particular, there is a problem in that the technique is applicable only to a stator having a symmetric structure.

A self-bearing step motor, which neither uses a mechanical bearing nor includes additional windings for supporting a stator, is disclosed in U.S. Pat. No. 5,424,595 entitled "integrated magnetic bearing/switched reluctance machine" issued to Mark A. Preston et al. The self-bearing step motor disclosed in the '595 patent is characterized in that it comprises a rotor having rotor teeth and a stator having stator teeth wound with windings and the windings are separated from one another and simultaneously excitable. Further, the self-bearing step motor of the '595 patent is characterized in that the same phase currents are distributed among the respective windings in an inversely proportional manner. Furthermore, it is characterized in that the stator teeth are disposed in diametrically opposite pairs.

However, the '595 patent is merely directed to a hetero polar type of step motor. In such a case, it is difficult to perform stable control of the self-bearing step motor, because a magnetic flux direction is changed upon rotation of the rotor. In particular, it is difficult to apply such a self-bearing step motor to a case where the stator teeth are a symmetrically arranged.

The features of the conventional magnetic levitation technology are that the windings are symmetrically disposed to magnetically float an object as shown in FIG. 1. Since the electromagnets are disposed to be symmetric with respect to the X- and Y-axes, four electromagnets are generally needed for performing a magnetic bearing function.

On the other hand, an asymmetric step motor is still widely utilized. The conventional self-bearing technology does not teach or suggest any control algorithms for allowing such an asymmetric step motor to be used as a self-bearing motor in the absence of the bearing coils.

In addition, the step motor causes the excited state of the electromagnets to be changed in regular order so as to rotate the rotor. The sequential change of the driving electromagnets according to such a phase change is one of the difficulties in developing the conventional step motor into the self-bearing step motor. In particular, since a circumferentially overlapped length of the stator and rotor teeth is changed upon rotation of a shaft of the motor, an overlapped sectional area through which the magnetic flux flows is also changed. Thus, change of magnetic force magnitude due to the sectional area change is also one of the causes of obstruction to the development of the self-bearing step motor.

DISCLOSURE OF INVENTION

The present invention is contemplated to solve the above problems.

An object of the present invention is to provide a self-bearing step motor system and a control method thereof, wherein the step motor itself can perform both motor and bearing functionalities without adding coils for performing the bearing functionality to a conventional step motor having an asymmetric arrangement of stator teeth.

According to an aspect of the present invention, there is provided a self-bearing step motor system, comprising a self-bearing step motor including a rotor having a plurality of rotor teeth, a stator having a plurality of stator teeth, a plurality of separate windings wound respectively around the plurality of stator teeth, and a plurality of sensors for measuring geometrical deviation of the rotor; and a controller which transforms a torque current for causing the rotor to rotate and control currents for performing a bearing function of supporting the rotor into predetermined supply currents capable of generating magnetic force for allowing the rotor to be supported while causing the rotor to rotate in accordance with outputs of the sensors which are fed back to the controller and position angles of the plurality of windings, and simultaneously distributes the supply currents among the plurality of windings grouped so that the same phase currents can be supplied thereto.

Further, the controller of the self-bearing step motor of the present invention preferably comprise a motor controller for outputting the predetermined torque current, a plurality of bearing controllers for outputting the control currents based on the outputs of the plurality of sensors fed back thereto, and a current regulator for generating the supply currents by adding up the predetermined torque current and the control currents adjusted in accordance with the position angles of the respective windings and for distributing the supply currents among the plurality of the windings grouped so that the same phase currents can be supplied thereto.

Furthermore, in the self-bearing step motor system of the present invention, the plurality of sensors includes a horizontal sensor for measuring a horizontal deviation of the rotor and a vertical sensor for measuring a vertical deviation of the rotor; the plurality of bearing controllers include a horizontal bearing controller for outputting a horizontal control current based on a fed back output of the horizontal sensor and a vertical bearing controller for outputting a vertical control current based on a fed back output of the vertical bearing sensor; and the current regulator distributes, among the plurality of windings grouped so that same phase currents can be supplied thereto, the supply currents obtained by multiplying the horizontal control current by a cosine value of the position angle of each winding, multiplying the vertical control current by a sine value of the position angle of each winding, and adding the two multiplied values to the output of the motor controller.

According to another aspect of the present invention, there is provided a method for controlling a self-bearing step motor including a rotor having a plurality of rotor teeth, a stator having a plurality of stator teeth, a plurality of separate windings wound respectively around the plurality of stator teeth, and a plurality of sensors for measuring geometric deviation of the rotor, comprising the steps of selecting the plurality of windings grouped so that the same currents can be supplied thereto, transforming a torque current for causing the rotor to rotate and control currents for performing a bearing function of supporting the rotor into predetermined supply currents capable of generating magnetic force for allowing the rotor to be supported while causing the rotor to rotate in accordance with outputs of the sensors which are fed back to the controller and position angles of the plurality of windings, and distributing the transformed supply currents among the plurality of selected windings.

In the method of the present invention, the plurality of sensors include a horizontal sensor for measuring a horizontal deviation of the rotor and a vertical sensor for measuring a vertical deviation of the rotor, and the step of transforming the torque current and the control currents into the supply currents is performed by multiplying the horizontal control current fed back from the output of the horizontal sensor by a cosine value of the position angle of each winding, multiplying the vertical control current fed back from the output of the vertical sensor by a sine value of the position angle of each winding, and adding the two multiplied values to the predetermined torque current.

According to the present invention, a step motor having a general constitution can be used as a self-bearing step motor regardless of whether the stator teeth 21 are arranged symmetrically and asymmetrically. Further, the self-bearing step motor can be controlled by disconnecting the connection of the windings of the conventional step motor, utilizing sensors for detecting geometric deviation of the rotor, and simultaneously distributing currents having the same phases corresponding to position angles of the stator teeth among a plurality of windings.

BEST MODE FOR CARRYING OUT THE INVENTION

Hereinafter, a preferred embodiment of the present invention will be described in detail with reference to the accompanying drawings.

Figure 3:
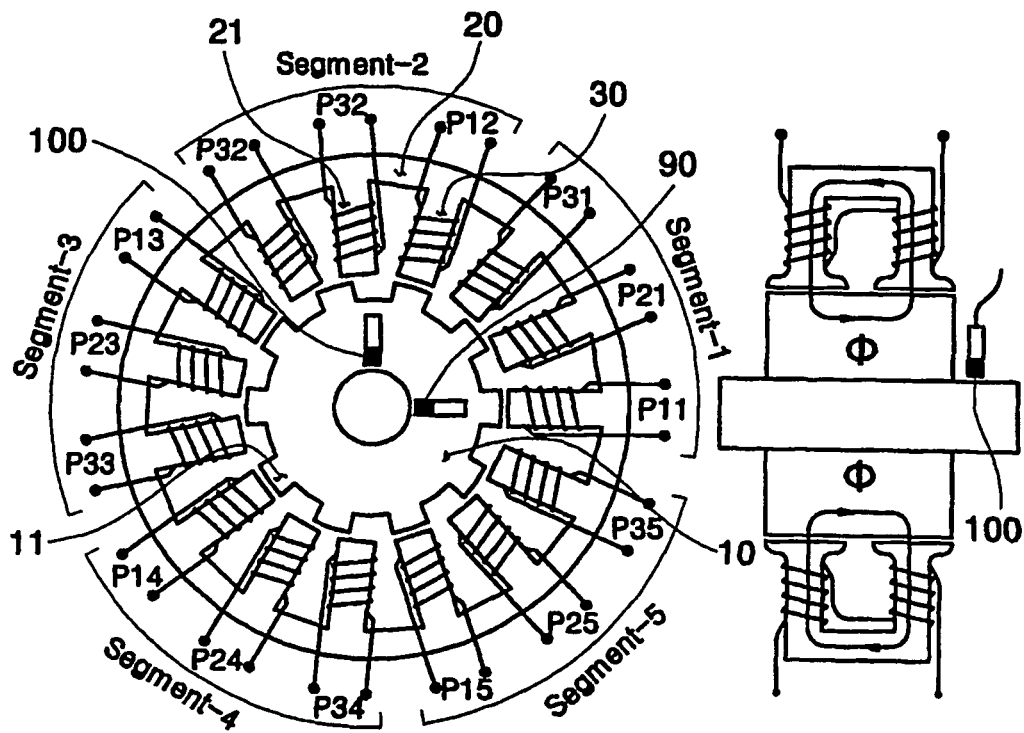
FIG. 3 is a schematic view of a self-bearing step motor according to an embodiment of the present invention.

As shown in FIG. 3, a self-bearing step motor of the present invention comprises a rotor 10 having a plurality of rotor teeth 11; a stator 20 having a plurality of stator teeth 21; a plurality of separate windings 30 wound around the plurality of stator teeth of the stator, respectively; and a plurality of sensors 90, 100 for measuring geometric deviation of the rotor 10. The plurality of windings 30 are divided into three groups of the windings P11 to P15, P21 to P25, and P31 to P35 to which the same phase currents are supplied, respectively. Further, a predetermined amount of current for rotating the rotor with magnetic force is simultaneously distributed to each group of the plurality of windings 30 supplied with the same phase current, and each group of the windings 30 are excited. At this time, the supplied current distributed among the plurality of windings can be changed depending on output signals from the plurality of sensors and positions of the plurality of windings.

Figure 1:
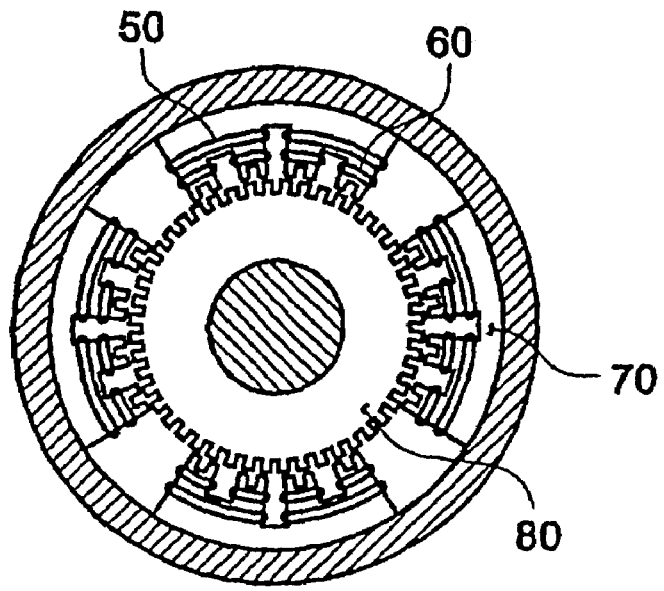
FIG. 1 is a schematic view of a conventional self-bearing step motor.
Figure 2:
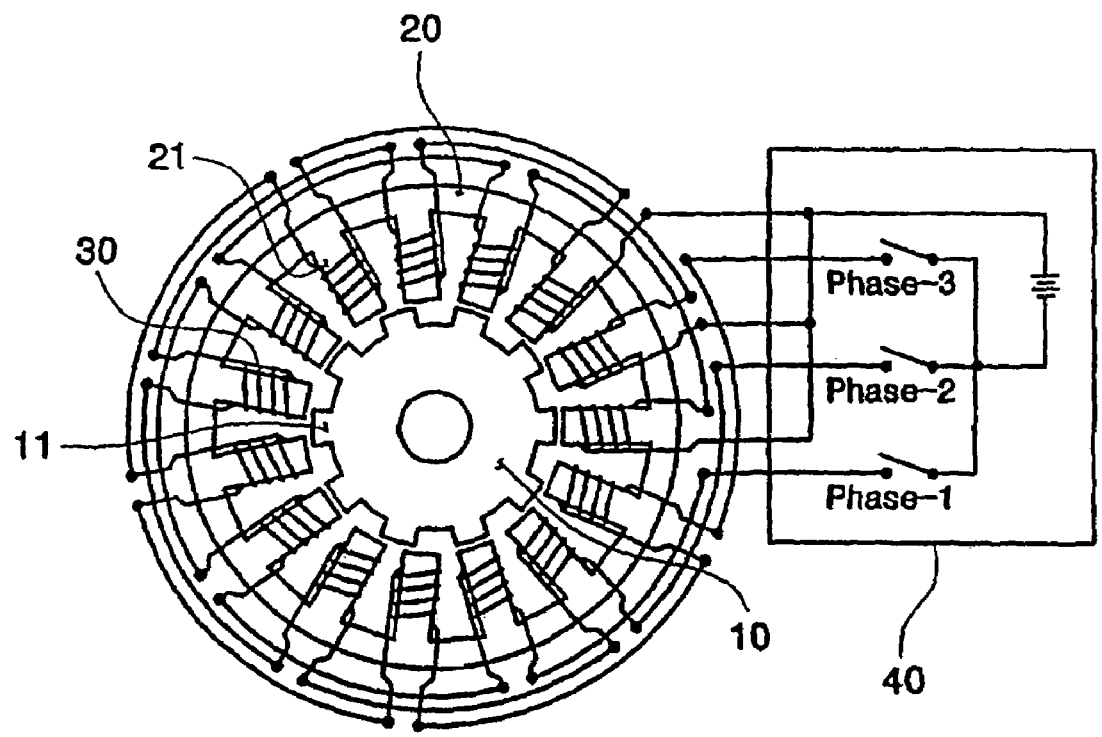
FIG. 2 is a schematic view showing a general constitution of a step motor.

In order to utilize a general asymmetric step motor shown in FIG. 2 as a self-bearing step motor, the respective coils or windings 30 connected in series are disconnected from one another so that the disconnected coils of the stator can be separately excited, as shown in FIG. 3. For the sake of convenience, the respective electromagnets (coils) are denoted by $P_{jk}$ and classified into five segments which include sets of electromagnets supplied with different phase currents, respectively. Here, j is a subscript used for differentiating the phases of the current supplied to the electromagnets and k is a subscript used for differentiating the segments that the electromagnets belong to. Magnitudes of the currents supplied to the respective coils vary according to geometric eccentricity of the center of the rotor, and accordingly different magnetic forces are generated from the respective electromagnets. Due to the difference in the magnetic forces, the rotor 10 can be supported and the geometric deviation can also be compensated.

In order to explain the magnetic forces exerted on the rotor according to the embodiment of the present invention, first a case where the rotor of the self-bearing step motor shown in FIG. 3 is offset by x and y along the X and Y axes will be discussed.

At this time, each air gap between the electromagnet $P_{jk}$ and the relevant rotor tooth is computed according to the following equation (1):

$$h_{jk} = h_s - x \cos \theta_{jk} - y \sin \theta_{jk}, \quad (1)$$

where $h_s$ is a radial air gap with the rotor in a centered position of each of the electromagnets (coils), i.e. the stator teeth, and $\theta_{jk}$ is an angle of a circumferential position of each electromagnet measured with respect to a reference position. The angle depends on the number of the electromagnets $N_s$ and the number of the segments $N_k$, and is computed according to the following equation:

$$\theta_{jk} = (2\pi/N_k)(k-1) + (2\pi/N_s)(j-1) \quad (2)$$

By using the equations (1) and (2), the air gaps between the rotor teeth and the electromagnets located at arbitrary angular positions can be computed irrespective of whether or not the stator teeth are arranged symmetrically in an angular direction.

In theory, if the number of the electromagnets driven at once is three or more, all the step motors can be utilized as the self-bearing step motor irrespective of whether the electromagnets are arranged symmetrically in the angular direction.

Figure 4:
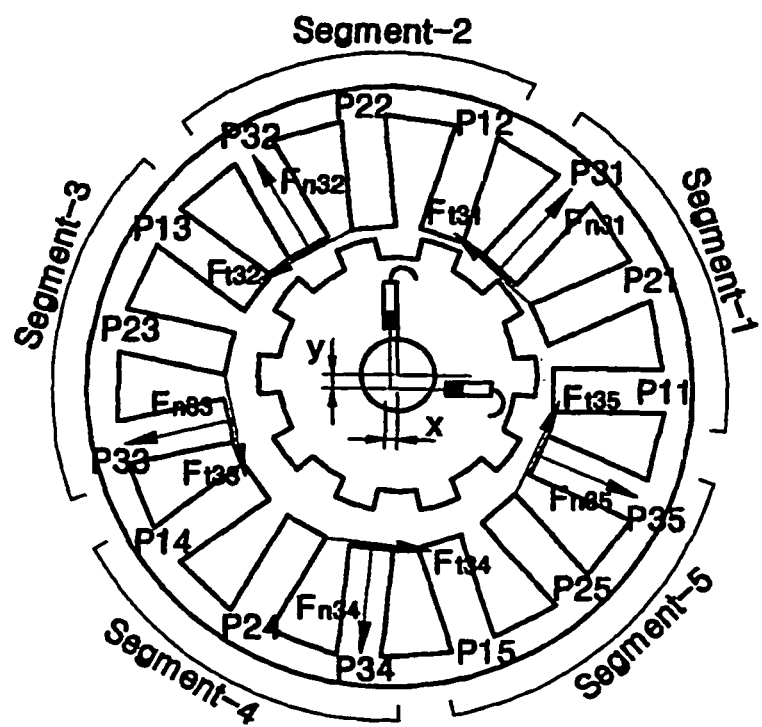
FIG. 4 is a schematic view illustrating forces generated from the self-bearing step motor according to the embodiment of the present invention.

The differences in the air gaps of the respective driven electromagnets have direct influences on the amount of control currents for compensating the differences. Thus, a supply current flowing through each electromagnet coil can be expressed as the following equation (3):

$$i_{jk} = i_t + i_x \cos \theta_{jk} + i_y \sin \theta_{jk}, \quad (3)$$

where $i_{jk}$ is a $j^{th}$ phase supply current flowing through the electromagnet coils in the $k^{th}$ segment, $i_t$ is a torque current, and $i_x$ and $i_y$ are control currents for the bearing functionality which are added to the coils for compensating a position of the rotor. That is, as shown in FIG. 4, if the electromagnets supplied with a $3^{rd}$ phase (j=3) current are to be driven, the electromagnets (coils) P31, P32, P33, P34, and P35 corresponding to the windings supplied with the $3^{rd}$ phase current are supplied with the current and thus excited. The air gap $h_{3k}$ of each electromagnet supplied with the $3^{rd}$ phase current can be computed from the equation (1) by using a value of the eccentricity measured from the X and Y directional sensors, and the current $i_{3k}$ supplied to each electromagnet can be computed from the equation (3). Because of the above geometric relationships among the electromagnets supplied with the same phase currents, a summation of the second and third terms, i.e. $\Sigma i_x \cos \theta_{jk} + \Sigma i_y \sin \theta_{jk}$, in the equation (3) is always zero for all of the windings supplied with the $3^{rd}$ phase current. That is, when the control currents are added to an arbitrary electromagnet in order to compensate the position of the rotor, the control currents are correspondingly subtracted from the other electromagnets. Accordingly, the summation of all the control currents is zero.

Figure 5:
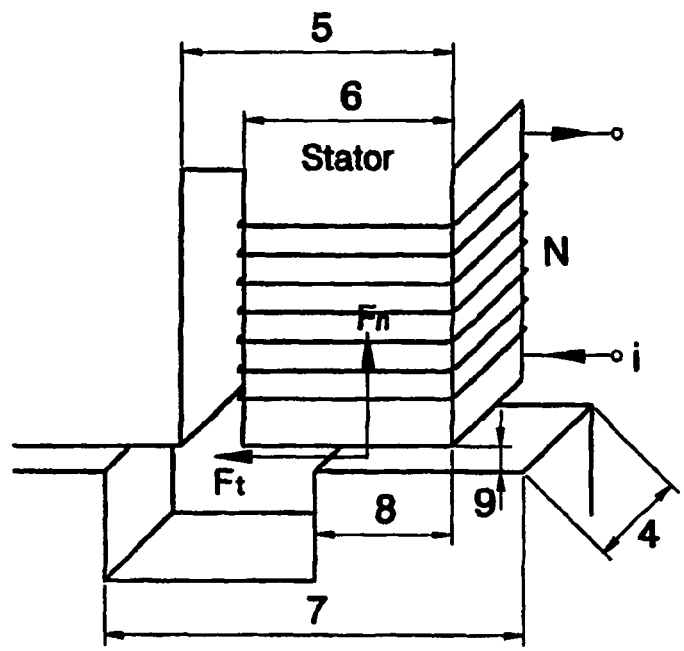
FIG. 5 is an enlarged view showing an overlapped portion of stator and rotor teeth upon rotation of the self-bearing step motor according to the embodiment of the present invention.

FIG. 5 is an enlarged view of teeth portions of the rotor and stator for illustrating an influence on bearing rigidity, which is exerted by a change in an overlapped length of the stator teeth and rotor teeth upon rotation of the rotor.

A tangential directional magnetic force Ft and a normal directional magnetic force Fn are determined based on geometrical and magnetic characteristics of the electromagnets and teeth. In general, the step motor uses Maxwell force by which the tangential and normal directional magnetic forces are generated. Further, the tangential magnetic force is proportional to the square of the supply current and inversely proportional to the air gap, whereas the normal directional magnetic force is proportional to the square of the supply current and inversely proportional to the square of the air gap. If it is assumed that x- and y-direction displacements and the control current are extremely smaller than the air gap and the torque current at a steady state of the motor, respectively, x- and y-direction components of the two normal and tangential directional magnetic forces can be linearized as expressed in the following equations (4) and (5):

$$F_{xj} = K_q x - K_{qc} y + K_i i_x - K_{ic} i_y \quad (4)$$

$$F_{yj} = K_{qc} x + K_q y + K_{ic} i_x + K_i i_y, \quad (5)$$

where $K_q$ and $K_{qc}$ are displacement stiffness of a system, and $K_i$ and $K_{ic}$ are current stiffness for controlling the system. In case of a variable reluctance (VR) type self-bearing step motor having the constitution according to the embodiment of the present invention shown in FIG. 3, the stiffness can be computed according to the following equations (6) and (7):

$$K_q = (\mu_0 L W N_k N^2 i_t^2)/h_s^3 \quad (6)$$

$$K_i = (\mu_0 L W N_k N^2 i_t)/h_s^2 \quad (7)$$

As expressed in the equations (6) and (7), the displacement stiffness and the current stiffness are related to the overlapped length 8 shown in FIG. 5. As the rotor is rotated, the overlapped length is changed and the stiffness of the system is also linearly changed. However, since the change of the overlapped length has an influence on the current stiffness directly affecting control signals as well as the displacement stiffness, a little mutual canceling effect can be obtained. In addition, due to a continuous fed back, system performance is not much influenced by the change of the overlapped length. However, in a case where it is designed such that a minimum overlapped length is too small, particularly a case where the minimum overlapped length is zero or lower, the displacement stiffness and the current stiffness are theoretically zero if a fringing effect is ignored. Thus, it is difficult to perform optimal control of the system. If a permanent magnet (PM) type step motor is to be utilized as the self-bearing step motor, the permanent magnet effect should be considered into the equations (6)and (7).

Figure 6:
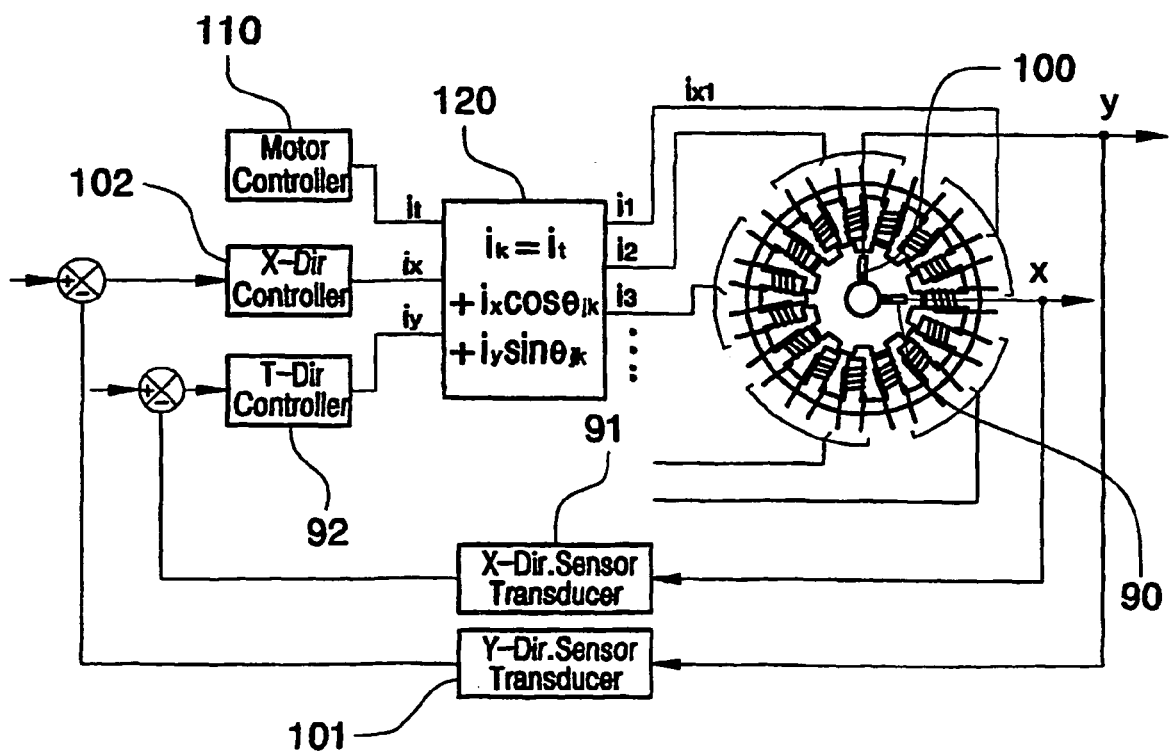
FIG. 6 is a control block diagram of the self-bearing step motor according to the embodiment of the present invention.

FIG. 6 schematically shows a block diagram of a control system for controlling the self-bearing step motor. In FIG. 6, there is shown a current regulator 120 for distributing and supplying currents to the electromagnets in regular order so as to excite the electromagnets. The current regulator 120 is also called a current distributor. In order to drive or rotate the step motor, the excited state of the electromagnets for generating the magnetic forces should be changed in the regular order. The current regulator 120 performs a function of adjusting the magnitude of the supply currents to the respective coils while allowing the conventional step motor to operate with the same frequency as the step motor driving frequency of a controller 110.

Hereinafter, the operation of a fed back control circuit for the self-bearing step motor will be explained in detail with reference to FIG. 6. The X- and Y-direction (horizontal and vertical direction) displacement sensors 90, 100 measure the geometric eccentric positions x, y of the rotor. Signals corresponding to the positions measured by the sensors pass through the X- and Y-direction transducers 91, 101, respectively. Then, the signals are compared with reference input signals and inputted into horizontal and vertical direction bearing controllers 92, 102, respectively. The horizontal and vertical direction bearing controllers generate and output horizontal and vertical control currents $i_x$, $i_y$. Further, a motor controller 110 generates and outputs a predetermined torque current $i_t$ for causing the rotor to rotate. The current regulator 120 receives the torque current $i_t$ and the horizontal and vertical control currents $i_x$, $i_y$, transforms them into the supply currents $i_k$ to be supplied to the respective windings, and outputs the supply currents at once. The supply currents supplied simultaneously to the respective windings are distributed among and supplied to the respective electromagnets, through the following procedures. That is, magnitudes of the horizontal and vertical control currents are first adjusted in accordance with the second and third terms of the equation (3) depending on the angular positions of the windings to be supplied with the currents. Then, the control currents $i_x$, $i_y$ are added to the torque current $i_t$, and thus, the supply currents are obtained. At this time, the adjusted part of the control currents in each of the supply currents (i.e., the currents obtained from the second and third terms of the equation (3)) can be added to or subtracted from the torque current in accordance with the geometric deviation of the rotor, but the summation of the adjusted part of the control currents is always zero.

Thus, by utilizing the self-bearing step motor and controller shown in FIG. 6, the self-bearing step motor can be efficiently controlled without provisions of the mechanical bearings and additional bearing coils and irrespective of symmetric or asymmetrical arrangement of the step motor.

INDUSTRIAL APPLICABILITY

According to the present invention constructed as such, the self-bearing step motor of the present invention can replace the conventional step motor. In particular, owing to advantages of the magnetic levitation technology, the self-bearing step motor can be used semipermanently even in severe environments in which high cleanness and vacuum are required, without a need for maintenance thereof. Thus, wide industrial application thereof can be obtained. Further, the self-bearing step motor of the present invention can be applied to computer disk drive spindles, bio-pumps, canned motor pumps, etc. Furthermore, the self-bearing step motor can also be manufactured as a micro actuator.

It should be understood that the embodiment of the present invention described above and illustrated in the drawings is not construed as limiting the technical spirit of the present invention. The scope of the invention is defined only by the appended claims, and those skilled in the art can make various changes and modifications to the embodiment of the present invention within the scope of the invention. Thus, such changes and modifications fall within the scope of the invention as far as they are obvious to those skilled in the art.

The invention claimed is:

1. A self-bearing step motor system, comprising:
a self-bearing step motor including a rotor having a plurality of rotor teeth, a stator having a plurality of stator teeth, a plurality of separate windings wound respectively around the plurality of stator teeth, and a plurality of sensors for measuring geometrical deviation of the rotor, the plurality of sensors includes a horizontal sensor for measuring a horizontal deviation of the rotor and a vertical sensor for measuring a vertical deviation of the rotor; and
a controller which transforms a torque current for causing the rotor to rotate and control currents for performing a bearing function of supporting the rotor into predetermined supply currents capable of generating magnetic force for allowing the rotor to be supported while causing the rotor to rotate in accordance with outputs of the sensors which are fed back to the controller and position angles of the plurality of windings, and simultaneously distributes the supply currents among the plurality of windings grouped so that same phase currents can be supplied thereto, the controller comprising:
a motor controller for outputting the predetermined torque current:
a plurality of bearing controllers for outputting the control currents based on the outputs of the plurality of sensors fed back thereto, the plurality of bearing controllers include a horizontal bearing controller for outputting a horizontal control current based on an output of the horizontal sensor which is fed back to the horizontal bearing controller and a vertical bearing controller for outputting a vertical control current based on an output of the vertical bearing sensor which is fed back to the vertical bearing controller; and
a current regulator for generating the supply currents by adding up the predetermined torque current and the control currents adjusted in accordance with the position angles of the respective windings and for distributing the supply currents among the plurality of the windings grouped so that the same phase currents can be supplied thereto, the supply currents obtained by multiplying the horizontal control current by a cosine value of the position angle of each winding, multiplying the vertical control current by a sine value of the position angle of each winding, and adding the two multiplied values to the output of the motor controller.

2. The self-bearing step motor system as claimed in claim 1, wherein the plurality of stator teeth and windings are arranged to generate magnetic flux in a rotor axial direction.

3. A method for controlling a self-bearing step motor including a rotor having a plurality of rotor teeth, a stator having a plurality of stator teeth, a plurality of separate windings wound respectively around the plurality of stator teeth, and a plurality of sensors for measuring geometric deviation of the rotor, the plurality of sensors include a horizontal sensor for measuring a horizontal deviation of the rotor and a vertical sensor for measuring a vertical deviation of the rotor, the method comprising the steps of:

selecting the plurality of windings grouped so that the same currents can be supplied thereto;

transforming a torque current for causing the rotor to rotate and control currents for performing a bearing function of supporting the rotor into predetermined supply currents capable of generating magnetic force for allowing the rotor to be supported while causing the rotor to rotate in accordance with outputs of the sensors which are fed back to the controller and position angles of the plurality of windings, the transforming the torque current and the control currents into the supply currents is performed by multiplying a horizontal control current fed back from the output of the horizontal sensor by a cosine value of the position angle of each winding, multiplying the vertical control current fed back from the output of the vertical sensor by a sine value of the position angle of each winding, and adding the two multiplied values to the predetermined torque current; and distributing the transformed supply currents among the plurality of selected windings.

4. The method as claimed in claim 3, wherein the plurality of stator teeth and windings are arranged to generate magnetic flux in a rotor axial direction.

* * * * *